(12) United States Patent
Yeh

(10) Patent No.: US 9,088,023 B2
(45) Date of Patent: Jul. 21, 2015

(54) END COVER ASSEMBLY OF BATTERY

(75) Inventor: Sheng-Fa Yeh, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 496 days.

(21) Appl. No.: 13/193,610

(22) Filed: Jul. 29, 2011

(65) Prior Publication Data

US 2012/0251875 A1 Oct. 4, 2012

(30) Foreign Application Priority Data

Mar. 29, 2011 (TW) .............................. 100110768 A

(51) Int. Cl.
*H01M 2/04* (2006.01)
*H01M 2/06* (2006.01)
*H01M 2/30* (2006.01)

(52) U.S. Cl.
CPC ............ *H01M 2/046* (2013.01); *H01M 2/0478* (2013.01); *H01M 2/06* (2013.01); *H01M 2/30* (2013.01)

(58) Field of Classification Search
CPC .... H01M 2/046; H01M 2/06; F16B 2043/008
USPC .......................................... 429/182, 183, 179
See application file for complete search history.

(56) References Cited

U.S. PATENT DOCUMENTS

| 3,212,393 | A | * | 10/1965 | Waeltz | .................. 411/371.2 |
| 4,031,935 | A | | 6/1977 | Jones et al. | |
| 5,707,758 | A | | 1/1998 | Iwatsu et al. | |
| 7,285,355 | B2 | | 10/2007 | Ruth et al. | |
| 2002/0039679 | A1 | * | 4/2002 | Akita et al. | .................. 429/183 |
| 2003/0017391 | A1 | * | 1/2003 | Peterson et al. | .............. 429/182 |
| 2003/0104276 | A1 | * | 6/2003 | Mizuno et al. | .................. 429/181 |
| 2004/0127952 | A1 | | 7/2004 | O'Phelan et al. | |
| 2005/0034978 | A1 | | 2/2005 | Kazi et al. | |
| 2005/0106952 | A1 | | 5/2005 | Maxwell et al. | |

(Continued)

FOREIGN PATENT DOCUMENTS

| CN | 1345099 A | 4/2002 |
| CN | 101212068 | 7/2008 |

(Continued)

OTHER PUBLICATIONS

"Office Action of U.S. Counterpart Application", issued on Mar. 14, 2014, p. 1-p. 11.

(Continued)

*Primary Examiner* — Zachary Best
(74) *Attorney, Agent, or Firm* — Jianq Chyun IP Office

(57) ABSTRACT

An end cover assembly of battery includes a battery end cover, a terminal substrate, an airtight insulating pad and a secure assembly. The battery end cover has first and second surfaces and a first opening. The terminal substrate is disposed on the first surface of the battery end cover and has a protrusion portion and a airtight ring, wherein the protrusion portion penetrate through the battery end cover through the first opening, and the airtight ring is disposed towards the battery end cover around the protrusion portion. The airtight insulating pad is sandwiched between the terminal substrate and the battery end cover. The secure assembly is disposed on the second surface of the battery end cover to collaborate with the terminal substrate for fixing the battery end cover and making the battery end cover and the airtight ring to press the airtight insulating pad to achieve an airtight effect.

7 Claims, 7 Drawing Sheets

(56) References Cited

U.S. PATENT DOCUMENTS

| | | |
|---|---|---|
| 2007/0154797 A1 | 7/2007 | Hyung et al. |
| 2009/0142660 A1* | 6/2009 | Hori et al. .............. 429/174 |
| 2009/0246605 A1 | 10/2009 | Chang et al. |
| 2010/0273046 A1* | 10/2010 | Kuo et al. .............. 429/175 |

FOREIGN PATENT DOCUMENTS

| | | |
|---|---|---|
| CN | 101295773 A | 10/2008 |
| CN | 201175806 | 1/2009 |
| CN | 101447558 A | 6/2009 |
| EP | 28116 | 8/1986 |
| EP | 144569 | 1/1991 |
| JP | H11162521 | 6/1999 |
| JP | 2006040771 | 2/2006 |
| JP | 2006073339 | 3/2006 |
| JP | 2006338981 | 12/2006 |
| JP | 2007042527 | 2/2007 |
| JP | 2007184233 | 7/2007 |
| JP | 2008084726 | 4/2008 |
| JP | 2008130482 | 6/2008 |
| JP | 2008269904 | 11/2008 |
| JP | 2008311184 | 12/2008 |
| JP | 2009123438 | 6/2009 |
| JP | 2009123440 | 6/2009 |
| JP | 2009187724 | 8/2009 |
| JP | 2010015852 | 1/2010 |
| JP | 2010092874 | 4/2010 |
| JP | 2010140715 | 6/2010 |
| KR | 200434772 | 12/2006 |
| TW | 555164 | 9/2003 |
| TW | 568362 | 12/2003 |
| TW | 581377 | 3/2004 |
| TW | M366179 | 10/2009 |
| TW | I318473 | 12/2009 |
| TW | I318475 | 12/2009 |
| TW | M379178 | 4/2010 |
| TW | M379179 | 4/2010 |
| TW | M385096 | 7/2010 |
| TW | M385808 | 8/2010 |
| TW | M386602 | 8/2010 |

OTHER PUBLICATIONS

"First Office Action of China Counterpart Application", issued on Jan. 27, 2014, p. 1-p. 8.

"Office Action of Taiwan counterpart application" issued on Oct. 22, 2013, p. 1-p. 3.

* cited by examiner

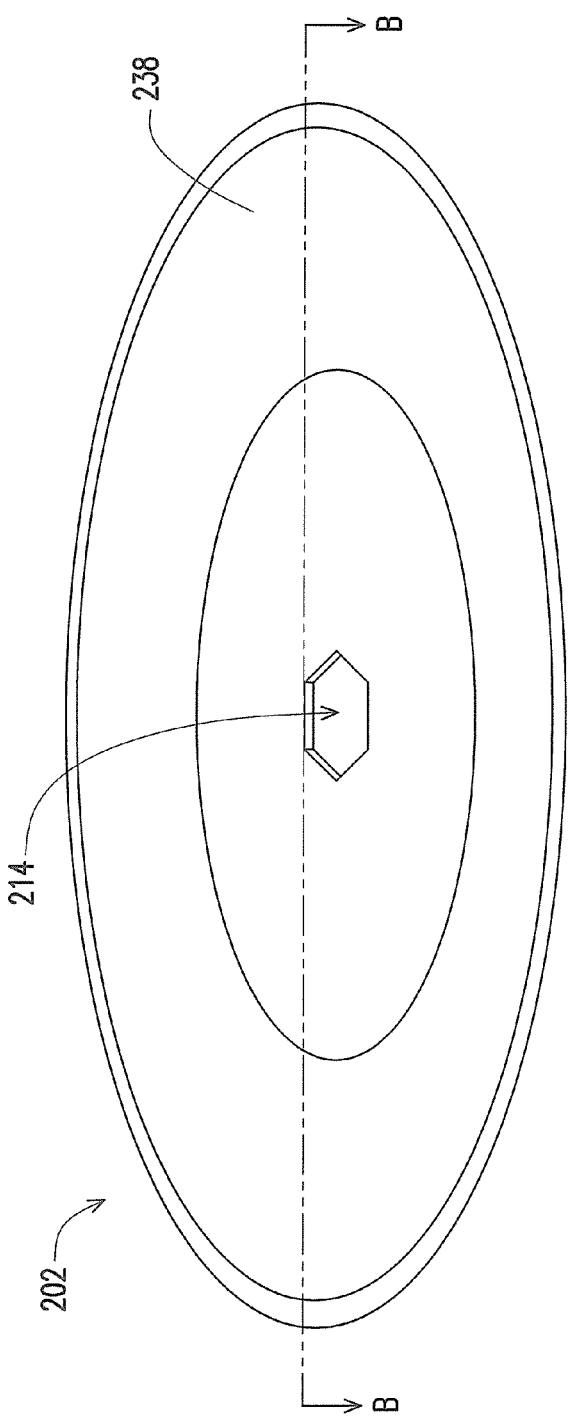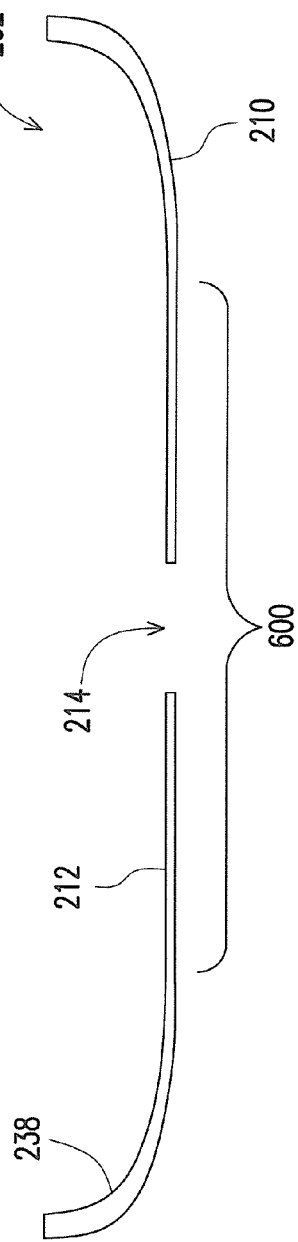

END COVER ASSEMBLY OF BATTERY

CROSS-REFERENCE TO RELATED APPLICATION

This application claims the priority benefit of Taiwan application serial no. 100110768, filed on Mar. 29, 2011. The entirety of the above-mentioned patent application is hereby incorporated by reference herein and made a part of this specification.

TECHNICAL FIELD

The disclosure relates to an end cover assembly of battery capable of maintaining a long-term airtight effect.

BACKGROUND

An end cover assembly of a conventional secondary battery is as shown in FIG. 1, in which a terminal substrate 100, a battery end cover 102, a pad 104 disposed between the terminal substrate 100 and the battery end cover 102 and a screw cap 106 are illustrated. Moreover, a pad 108 having an airtight or insulating function is disposed between the screw cap 106 and the battery end cover 102 for isolation. The end cover assembly of battery of FIG. 1 is suitable for welding to a tank of the secondary battery. However, in the above structure, when an external power line is locked to the terminal substrate 100, excessive force may cause air leakage between a base 110 of the terminal substrate 100 and the battery end cover 102 due to rotation, and electrolyte leakage may severely influence the battery performance and safety.

Therefore, there are a plenty of patents for ameliorating the end cover assembly of the secondary battery, for example, Taiwan Patent Publication No. 555164, in which a structure of a bottom surface of the battery end cover 102 is ameliorated to form a groove corresponding to a shape of the base 110 of the terminal substrate 100, so that shape matching of the base 110 and the groove may prevent the battery end cover 102 from unscrewing.

However, such structure amelioration still has a plenty of problems. For example, the screw cap 106 is liable to be loosed due to an external force (for example, vibration) to cause electrolyte leakage during a utilization period of the secondary battery.

SUMMARY

Embodiments disclosed herein may provide an end cover assembly of battery, which is capable of resolving problems such as electrolyte leakage, etc. of the conventional technique due to that airtightness of the end cover assembly cannot be maintained. The end cover assembly of battery at least including a battery end cover, a terminal substrate, an airtight insulating pad and a secure assembly. The battery end cover has a first surface, a second surface opposite to the first surface and a first opening penetrating through the first surface and the second surface. The terminal substrate is disposed on the first surface of the battery end cover, and has a protrusion portion, an airtight ring and a polygonal fixing portion, where the protrusion portion and the polygonal fixing portion penetrate through the battery end cover through the first opening, and the airtight ring is disposed towards the battery end cover around the protrusion portion. The airtight insulating pad is disposed between the terminal substrate and the battery end cover. The secure assembly is disposed on the second surface of the battery end cover to collaborate with the terminal substrate for fixing the battery end cover and making the battery end cover and the airtight ring of the terminal substrate to press the airtight insulating pad to achieve an airtight effect.

According to the above descriptions, in the end cover assembly of battery of the disclosure, since an airtight ring is designed on the terminal substrate, the battery end cover and the airtight ring can press the airtight insulating pad to achieve the airtight effect. Moreover, in the end cover assembly of battery of the disclosure, since shapes of various parts of the secure assembly are matched, after assembling, the components such as the screw cap can be totally fixed through welding so as to avoid loosing the screw cap due to the external force during a utilization period of the secondary battery.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

FIG. 6A and FIG. 6B are respectively a three-dimensional view of a battery end cover 202 and a cross-sectional view of the battery end cover 202 along a B-B line of FIG. 6A.

DESCRIPTION OF THE EMBODIMENTS

Figure 1:
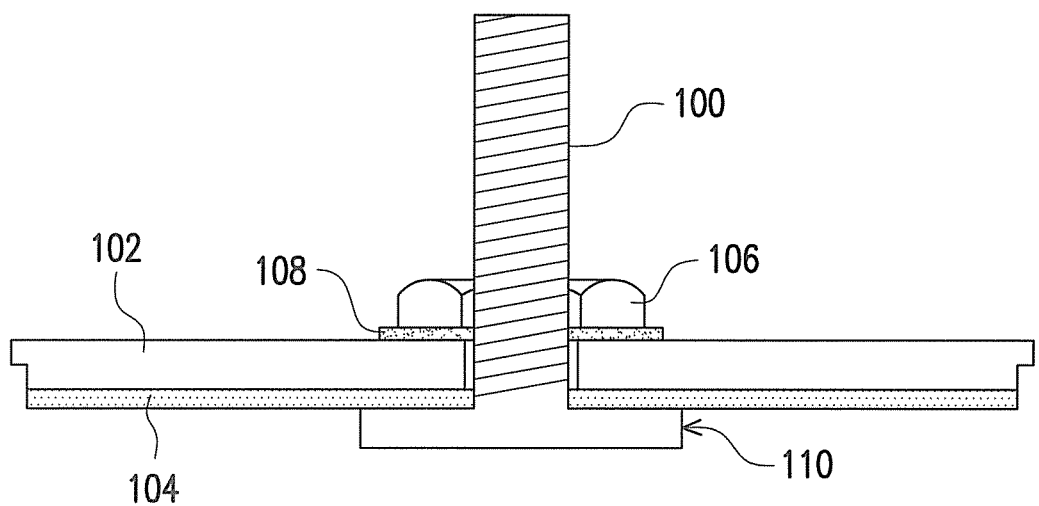
FIG. 1 is a cross-sectional view of a conventional end cover assembly of battery.

Embodiments are provided below with reference of drawings to fully describe the technique of the disclosure. Although the embodiments of the disclosure are illustrated by following drawings, the disclosure can still be implemented by different approaches, and is not limited to the provided embodiments. For clarity's sake, sizes and relative sizes of components and regions in the drawings are not necessarily drawn to scale.

Figure 2:
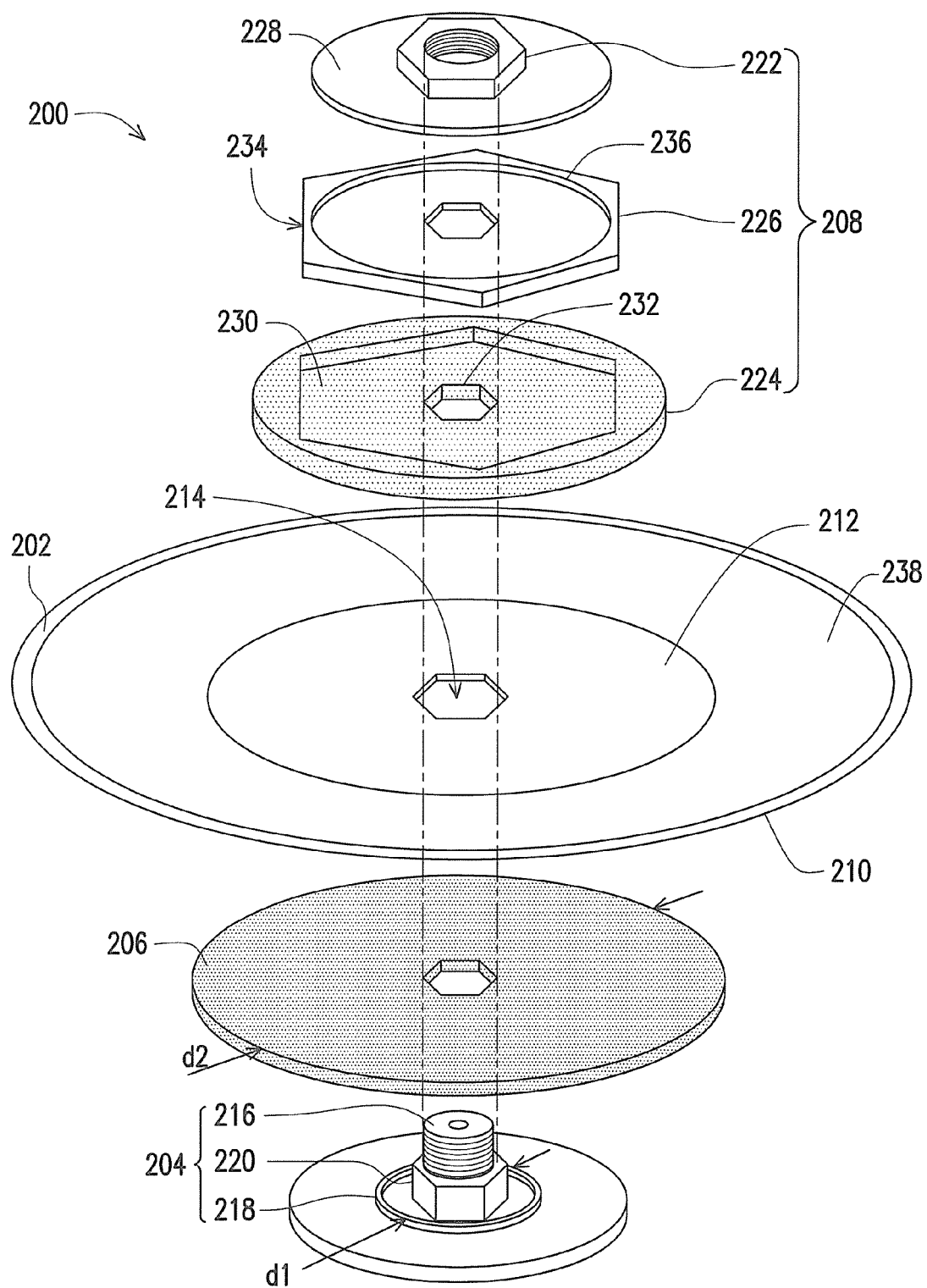
FIG. 2 is a three-dimensional exploded view of an end cover assembly of battery according to an exemplary embodiment of the disclosure.

FIG. 2 is a three-dimensional exploded view of an end cover assembly of battery according to an exemplary embodiment of the disclosure.

Referring to FIG. 2, the end cover assembly of battery 200 includes a battery end cover 202, a terminal substrate 204, an airtight insulating pad 206 and a secure assembly 208. The battery end cover 202 has a first surface 210, a second surface 212 opposite to the first surface 210 and a first opening 214 penetrating through the first surface 210 and the second surface 212. The terminal substrate 204 is disposed on the first surface 210 of the battery end cover 202, and has a protrusion portion 216, an airtight ring 218 and a polygonal fixing portion 220, where the protrusion portion 216 and the polygonal fixing portion 220 penetrate through the battery end cover 202 through the first opening 214, and the airtight ring 218 is disposed towards the battery end cover 202 around the protrusion portion 216. The airtight insulating pad 206 is disposed between the terminal substrate 204 and the battery end cover 202, where the airtight insulating pad 206 is, for example, a single layer structure or a multi-layer structure made of polypropylene (PP) or polyethylene (PE).

Referring to FIG. 2, the secure assembly 208 is disposed on the second surface 212 of the battery end cover 202 to collaborate with the terminal substrate 204 for fixing the battery end cover 202 and making the battery end cover 202 and the airtight ring 218 of the terminal substrate 204 to press the airtight insulating pad 206 to achieve an airtight effect. In FIG. 2, when a surface of the protrusion portion 216 of the terminal substrate 204 has an external thread, the secure assembly 208 includes a screw cap 222, an insulating sheet 224 and a stainless steel sheet 226. The screw cap 222 is used to screw-lock the protrusion portion 216 of the terminal substrate 204, and the screw cap 222 has a round bottom 228. The insulating sheet 224 is located between the battery end cover 202 and the screw cap 222, and the insulating sheet 224 has a polygonal groove 230 and a polygonal opening 232. As shown in FIG. 2, the polygonal groove 230 is a hexagonal groove, and the polygonal opening 232 has a hexagonal shape that matches a shape of the polygonal fixing portion 220 of the terminal substrate 2041. The stainless steel sheet 226 is located between the screw cap 222 and the insulating sheet 224, where a profile 234 of the stainless steel sheet 226 is a polygon, such as a hexagon that matches a shape of the polygonal groove 230. The stainless steel sheet 226 further includes a round groove 236 that matches the round bottom 228 of the screw cap 222.

Moreover, in the present exemplary embodiment, the stainless steel sheet 226 of the secure assembly 208 can be omitted, and only the screw cap 222 used to screw-lock the protrusion portion 216 and the insulating sheet 224 used to isolate the battery end cover 202 and the screw cap 222 are remained, where shapes of the screw cap 222 and the insulating sheet 224 are not limited to that shown in FIG. 2, and a general screw cap and insulating sheet can also be used.

Referring to FIG. 2, the battery end cover 202 is, for example, a bowl-shape end cover, so that the second surface 212 thereof is a concave surface 238. Moreover, in order to avoid a contact between the terminal substrate 204 and the battery end cover 202, an area of the polygonal fixing portion 220 is designed to be smaller than an opening area of the first opening 214 of the battery end cover 202. Moreover, isolation between the terminal substrate 204 and the battery end cover 202 can be strengthened according to a design of the insulating sheet 224, which is described later. A diameter d1 of the airtight ring 218 of the terminal substrate 204 is, for example, smaller than a diameter d2 of the airtight insulating pad 206.

Each of the components of FIG. 2 is described in detail with reference of figures.

Figure 3A:
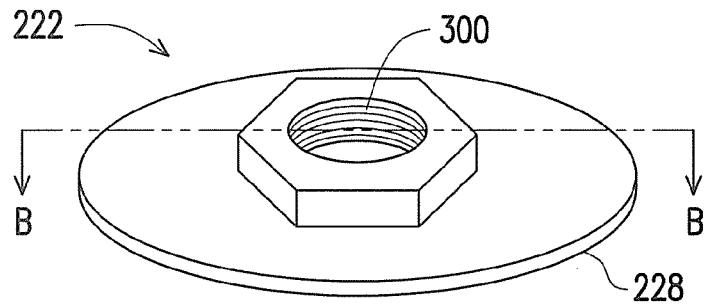
FIG. 3A and FIG. 3B are respectively a three-dimensional view of a screw cap 222 and a cross-sectional view of the screw cap 222 along a B-B line of FIG. 3A.
Figure 3B:
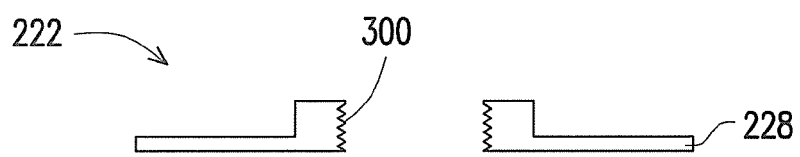

First, FIG. 3A and FIG. 3B are respectively a three-dimensional view of the screw cap 222 and a cross-sectional view of the screw cap 222 along a B-B line of FIG. 3A. In FIG. 3A and FIG. 3B, the screw cap 222 has a round bottom 228 and an internal thread 300 corresponding to the external thread of the protrusion portion (referring to 216 of FIG. 2).

Figure 4A:
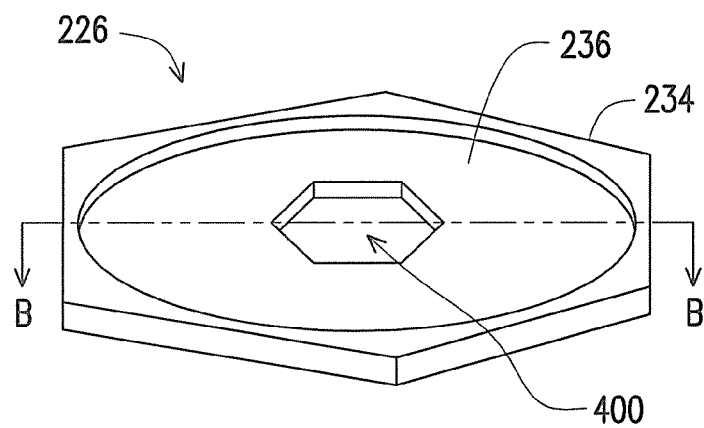
FIG. 4A and FIG. 4B are respectively a three-dimensional view of a stainless steel sheet 226 and a cross-sectional view of the stainless steel sheet 226 along a B-B line of FIG. 4A.
Figure 4B:
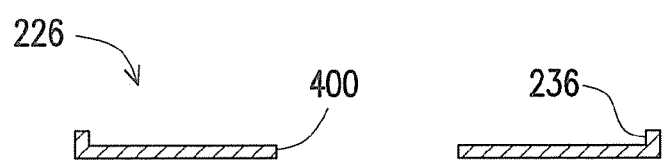

FIG. 4A and FIG. 4B are respectively a three-dimensional view of the stainless steel sheet 226 and a cross-sectional view of the stainless steel sheet 226 along a B-B line of FIG. 4A. In FIG. 4A and FIG. 4B, the profile 234 of the stainless steel sheet 226 is hexagonal, and the stainless steel sheet has the round groove 236. A second opening 400 corresponding to the polygonal fixing portion of the terminal substrate (referring to 220 of FIG. 2) is aimed at a center of the stainless steel sheet 226.

Figure 5A:
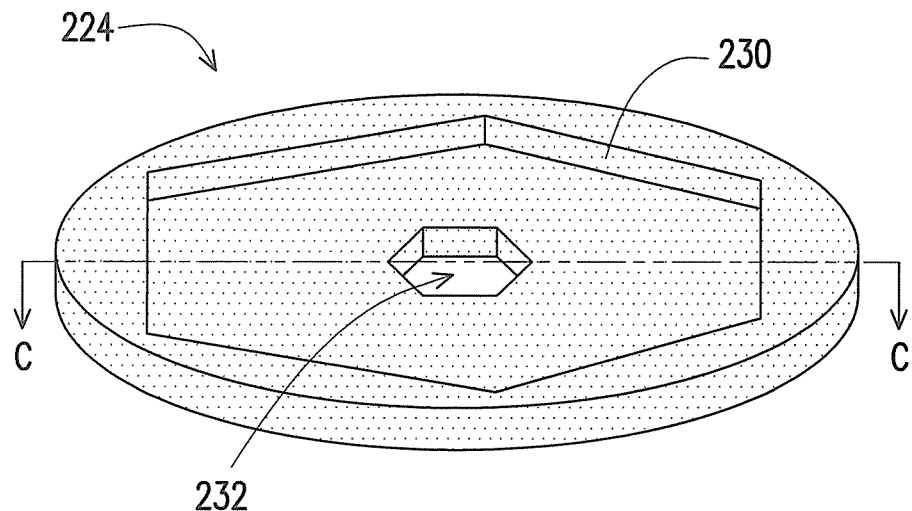
FIG. 5A and FIG. 5B are respectively a three-dimensional view and a three-dimensional back view of an insulating sheet 224.
Figure 5B:
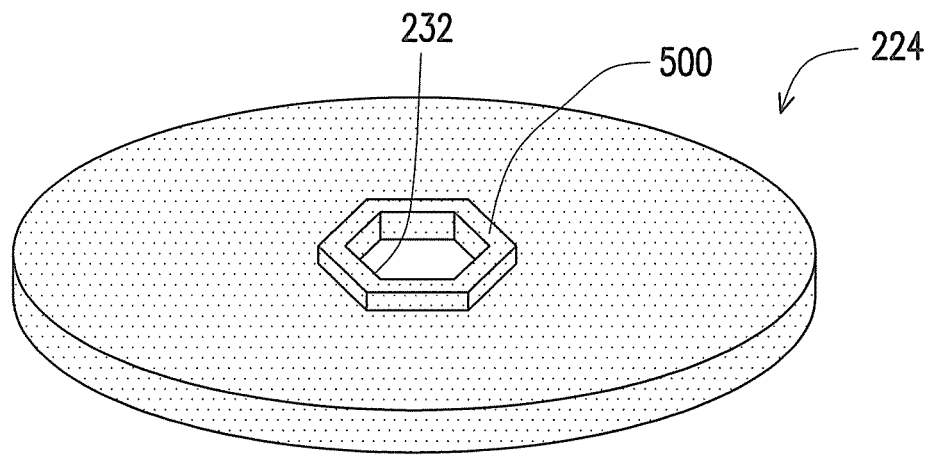
Figure 5C:
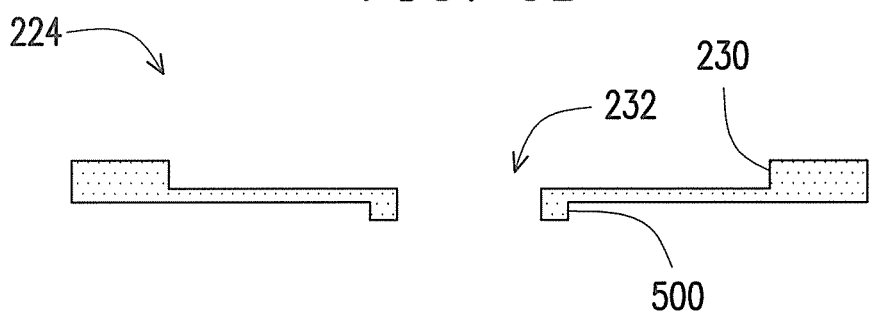
FIG. 5C is a cross-sectional view of the insulating sheet 224 along a C-C line of FIG. 5A.

FIG. 5A and FIG. 5B are respectively a three-dimensional view and a three-dimensional back view of the insulating sheet 224, and FIG. 5C is a cross-sectional view of the insulating sheet 224 along a C-C line of FIG. 5A.

In FIG. 5A-FIG. 5C, the insulating sheet 224 has the polygonal groove 230 and the polygonal opening 232, which corresponding to the polygonal fixing portion of the terminal substrate (referring to 220 of FIG. 2), and a protruding rim 500 is formed around the polygonal opening 232. Periphery of the protruding rim 500 preferably matches the opening area of the first opening 214 of FIG. 2.

FIG. 6A and FIG. 6B are respectively a three-dimensional view of the battery end cover 202 and a cross-sectional view of the battery end cover 202 along a B-B line of FIG. 6A. In FIG. 6B, the battery end cover 202 has a bowl-shape, so that the second surface 212 includes the concave surface 238, and a portion 600 of the first surface 210 that contacts the airtight insulating pad 206 is preferably a whole plane.

Figure 7A:
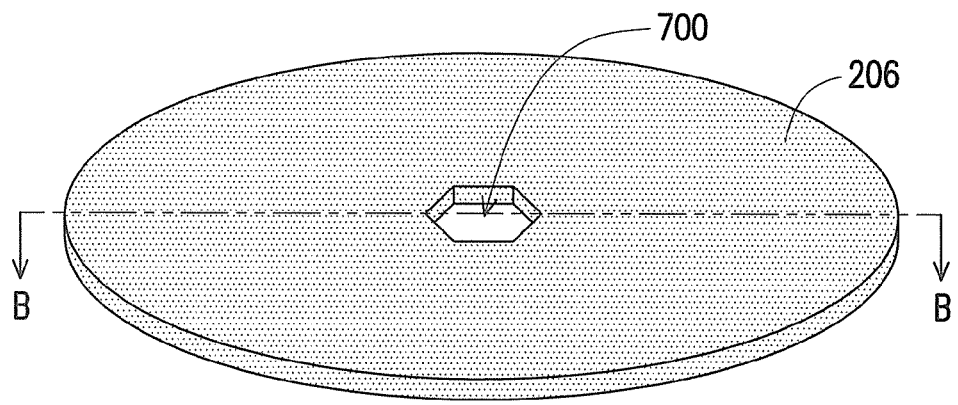
FIG. 7A and FIG. 7B are respectively a three-dimensional view of an airtight insulating pad 206 and a cross-sectional view of the airtight insulating pad 206 along a B-B line of FIG. 7A.
Figure 7B:

FIG. 7A and FIG. 7B are respectively a three-dimensional view of the airtight insulating pad 206 and a cross-sectional view of the airtight insulating pad 206 along a B-B line of FIG. 7A. In FIG. 7A and FIG. 7B, the airtight insulating pad 206 has a third opening 700 corresponding to the polygonal fixing portion of the terminal substrate (referring to 220 of FIG. 2).

Figure 8A:
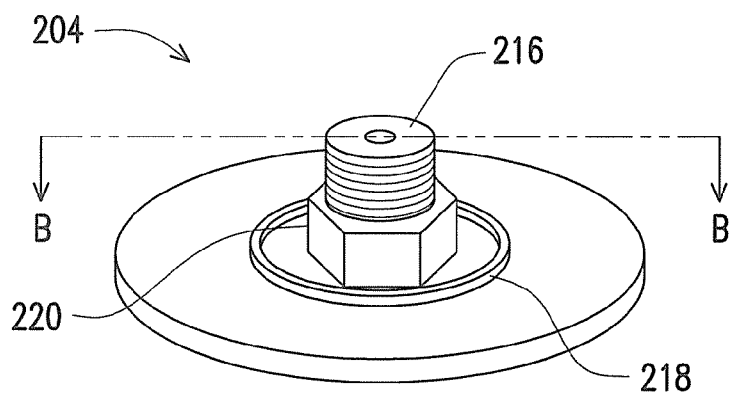
FIG. 8A and FIG. 8B are respectively a three-dimensional view of a terminal substrate 204 and a cross-sectional view of the terminal substrate 204 along a B-B line of FIG. 8A.
Figure 8B:
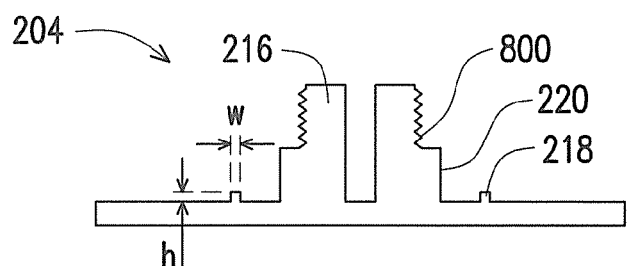

FIG. 8A and FIG. 8B are respectively a three-dimensional view of the terminal substrate 204 and a cross-sectional view of the terminal substrate 204 along a B-B line of FIG. 8A. In FIG. 8A and FIG. 8B, the surface of the protrusion portion 216 of the terminal substrate 204 has an external thread 800, a ring width w of the airtight ring 218 is, for example, between 0.1 mm and 0.3 mm, and a ring height h is, for example, between 0.2 mm-0.4 mm, though the actual size of the airtight ring 218 can be adjusted according to the size of the secondary battery and a thickness of the airtight insulating pad, etc. An area of the polygonal fixing portion 220 is smaller than the opening area of the first opening (referring to FIG. 214 of FIG. 2) of the battery end cover, and a height of the polygonal fixing portion 220 can be adjusted according to a total thickness of the battery end cover, the airtight insulating pad and the secure assembly after combination.

Figure 9:
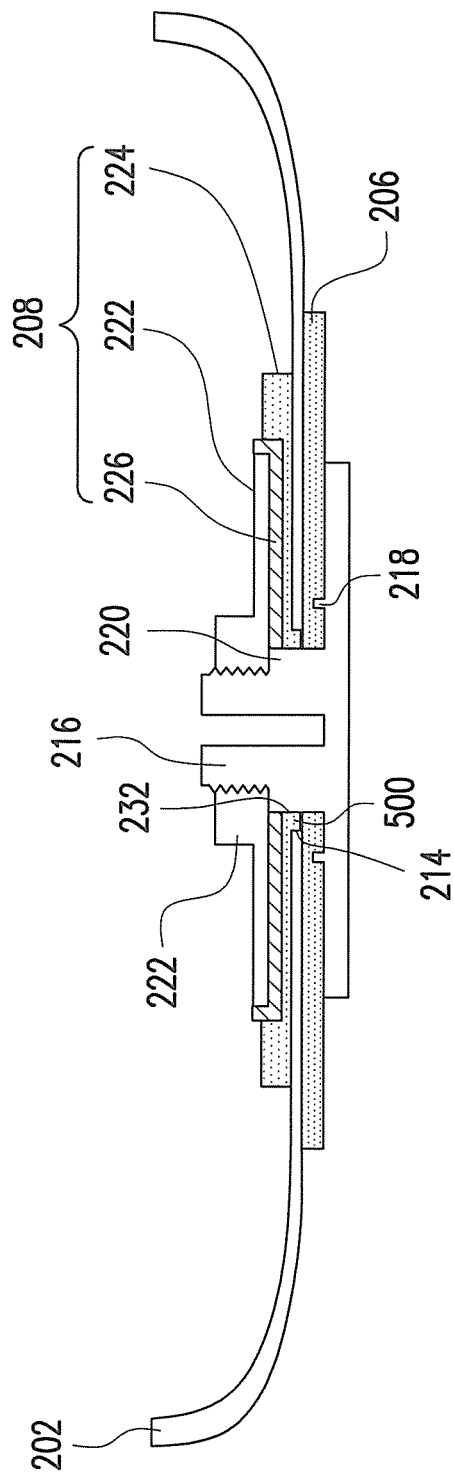
FIG. 9 is a cross-sectional view of an end cover assembly of battery.

A cross-sectional view of the battery end cover of FIG. 9 is obtained after assembling the aforementioned components.

According to FIG. 9, it is known that the airtight ring 218 of the terminal substrate 204 and the battery end cover 202 press the airtight insulating pad 206 to achieve the airtight effect. Moreover, after the insulating sheet 224 is disposed on the battery end cover 202, the protruding rim 500 thereof is engaged to the first opening 214 of the battery end cover 202, and after the polygonal fixing portion 220 is inserted into the battery end cover 202 from the bottom of the battery end cover 202, it is engaged to the polygonal opening 232 of the insulating sheet 224, so as to achieve insulation and prevent rotation. Moreover, in the end cover assembly of battery, since shapes of various parts (the screw cap 222, the insulating sheet 224 and the stainless steel sheet 226) of the secure assembly 208 are mutually matched, after assembling, the screw cap 222 and the stainless steel sheet 226 can bonded through welding so as to avoid loosing the screw cap 222 during a utilization period.

In summary, in the end cover assembly of battery of the disclosure, since an airtight ring is designed on the terminal substrate, the terminal substrate and the battery end cover can be locked to make the airtight ring pressing the airtight insulating pad to achieve the airtight effect. Moreover, in the end cover assembly of battery of the disclosure, based on shape matching of upper and lower surfaces of various parts of the secure assembly, the end cover assembly of battery can be totally fixed without loosing, so as to avoid air leakage due to influence of the external force during the utilization period of the secondary battery to cause electrolyte leakage to severely influence the battery performance and safety.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An end cover assembly of a battery, at least comprising:
   a battery end cover having a first surface, a second surface opposite to the first surface and a first opening penetrating through the first surface and the second surface;
   a terminal substrate disposed on the first surface of the battery end cover and having a protrusion portion, an airtight ring and a polygonal fixing portion, wherein a surface of the protrusion portion has an external thread, the protrusion portion and the polygonal fixing portion penetrate through the battery end cover through the first opening, and the airtight ring is disposed towards the battery end cover around the protrusion portion;
   an airtight insulating pad disposed between the terminal substrate and the battery end cover;
   a secure assembly disposed on the second surface of the battery end cover to collaborate with the terminal substrate for fixing the battery end cover and making the battery end cover and the airtight ring of the terminal substrate to press the airtight insulating pad to achieve an airtight effect so that the entire surfaces of the airtight ring contact close with the airtight insulating pad, wherein the secure assembly comprises:
   a protruding rim inserted into a space between the polygonal fixing portion and the first opening;
   a screw cap for screw-locking the protrusion portion of the terminal substrate, wherein the screw cap comprises a round bottom;
   an insulating sheet located between the battery end cover and the screw cap, wherein the insulating sheet comprises a polygonal groove; and
   a stainless steel sheet located between the screw cap and the insulating sheet, wherein a profile of the stainless steel sheet is a polygon that matches a shape of the polygonal groove, and the stainless steel sheet further comprises a round groove that matches the round bottom of the screw cap.

2. The end cover assembly of a battery as claimed in claim 1, wherein an area of the polygonal fixing portion of the terminal substrate is smaller than an opening area of the first opening of the battery end cover.

3. The end cover assembly of a battery as claimed in claim 1, wherein the airtight insulating pad is a multi-layer structure.

4. The end cover assembly of a battery as claimed in claim 1, wherein a diameter of the airtight ring of the terminal substrate is smaller than a diameter of the airtight insulating pad.

5. The end cover assembly of a battery as claimed in claim 1, wherein the battery end cover is a bowl-shape end cover, and the second surface is a concave surface.

6. The end cover assembly of a battery as claimed in claim 1, wherein the insulating sheet has a polygonal opening, an opening area of the polygonal opening is smaller than an opening area of the first opening of the battery end cover, and the protruding rim is disposed around the polygonal opening, and after the insulating sheet, the battery end cover and the terminal substrate are assembled, the polygonal fixing portion of the terminal substrate and the battery end cover are isolated through the protruding rim.

7. The end cover assembly of a battery as claimed in claim 1, wherein the screw cap and the stainless steel sheet are bonded through welding.

* * * * *